US008280907B2

(12) United States Patent
Dettinger et al.

(10) Patent No.: US 8,280,907 B2
(45) Date of Patent: Oct. 2, 2012

(54) SYSTEM AND METHOD FOR MANAGING ACCESS TO DATA IN A DATABASE

(75) Inventors: Richard D. Dettinger, Rochester, MN (US); Daniel P. Kolz, Rochester, MN (US); Richard J. Stevens, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1737 days.

(21) Appl. No.: 11/290,895

(22) Filed: Nov. 30, 2005

(65) Prior Publication Data

US 2007/0124303 A1 May 31, 2007

(51) Int. Cl.
*G06F 7/00* (2006.01)
*G06F 17/30* (2006.01)
(52) U.S. Cl. ........................................ 707/787; 707/722
(58) Field of Classification Search .................. 707/787, 707/722
See application file for complete search history.

(56) References Cited

U.S. PATENT DOCUMENTS

| 6,725,227 | B1 | 4/2004 | Li |
| 2001/0021926 | A1* | 9/2001 | Schneck et al. ................. 705/54 |
| 2002/0108053 | A1* | 8/2002 | Kashiwada .................. 713/193 |
| 2004/0139043 | A1* | 7/2004 | Lei et al. ........................... 707/1 |

FOREIGN PATENT DOCUMENTS

CN 1429374 7/2003

\* cited by examiner

*Primary Examiner* — Apu Mofiz
*Assistant Examiner* — Chelcie Daye
(74) *Attorney, Agent, or Firm* — Patterson & Sheridan LLP

(57) ABSTRACT

A method, system and article of manufacture for data processing and more particularly for managing access to data in a database that should be available for a limited number of accesses. One embodiment provides a method comprising receiving, from a requesting entity, a query against a database having consumable data that is configured to be accessible for only a predefined number of accesses. The query is configured to access the consumable data and is executed against the database to obtain a query result that includes the consumable data. The method further comprises determining whether the predefined number of accesses is reached as a result of the execution of the query against the database. If so, the consumable data is made inaccessible. The obtained query result is returned to the requesting entity.

10 Claims, 4 Drawing Sheets

SYSTEM AND METHOD FOR MANAGING ACCESS TO DATA IN A DATABASE

CROSS-RELATED APPLICATIONS

This application is related to the following commonly owned application: U.S. patent application Ser. No. 10/083,075, filed Feb. 26, 2002, entitled "APPLICATION PORTABILITY AND EXTENSIBILITY THROUGH DATABASE SCHEMA AND QUERY ABSTRACTION", which is hereby incorporated herein in its entirety.

BACKGROUND OF THE INVENTION

1. Field of the Invention

The present invention generally relates to data processing and more particularly to managing access to data in a database.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways.

Regardless of the particular architecture, in a DBMS, a requesting entity (e.g., an application or the operating system) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL). Illustratively, SQL is used to make interactive queries for getting information from and updating a database such as International Business Machines' (IBM) DB2, Microsoft's SQL Server, and database products from Oracle, Sybase, and Computer Associates. The term "query" denominates a set of commands for retrieving data from a stored database. Queries take the form of a command language that lets programmers and programs select, insert, update, find out the location of data, and so forth.

Any requesting entity, including applications, operating systems and, at the highest level, users, can issue queries against a database to retrieve one or more required data items. The required data items are persistently stored in the database and can thus be accessed multiple times by each authorized requesting entity. However, in particular cases it can be desirable to make a specific data item available only for a limited number of accesses. For instance, assume a given company that maintains a database that provides delivery status information to clients. Assume further that the available storage capacity of the database is restricted. To this end, the size of the database must be kept small and, therefore, each client of the company is allowed to access particular delivery status information only a single time. Thus, when the corresponding client has accessed the particular delivery status information, this information is deleted from the database in order to economize storage capacity. Subsequently, when new delivery status information is available for the corresponding client, he/she may again access this information only a single time. Thus, the size of the database can be managed accurately.

Implementing such a schema that only allows a limited number of accesses to data items stored in a conventional database requires implementation of a suitable programming logic. The programming logic would need to monitor access to the delivery status information and trigger deletion thereof when a corresponding access to the information has occurred. However, implementation of such a programming logic is a complex and time-consuming task and requires a detailed understanding of the underlying database.

Therefore, there is a need for an efficient technique for managing data in a database that should be available for a limited number of accesses.

SUMMARY OF THE INVENTION

The present invention generally is directed to a method, system and article of manufacture for data processing and, more particularly, for managing access to data in a database that should be available for a limited number of accesses.

One embodiment provides a computer-implemented method of managing access to data in a database. The method comprises receiving, from a requesting entity, a query against a database having consumable data. The consumable data is configured to be accessible for only a predefined number of accesses. The query is configured to access the consumable data. The query is executed against the database to obtain a query result that includes the consumable data. The method further comprises determining whether the predefined number of accesses is reached as a result of the execution of the query against the database. If so, the consumable data is made inaccessible. The obtained query result is returned to the requesting entity.

Another embodiment provides a computer-readable medium containing a program which, when executed by a processor, performs operations for managing access to data in a database. The operations comprise receiving, from a requesting entity, a query against a database having consumable data. The consumable data is configured to be accessible for only a predefined number of accesses. The query is configured to access the consumable data. The query is executed against the database to obtain a query result that includes the consumable data. The operations further comprise determining whether the predefined number of accesses is reached as a result of the execution of the query against the database. If so, the consumable data is made inaccessible. The obtained query result is returned to the requesting entity.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Introduction

Figure 1:
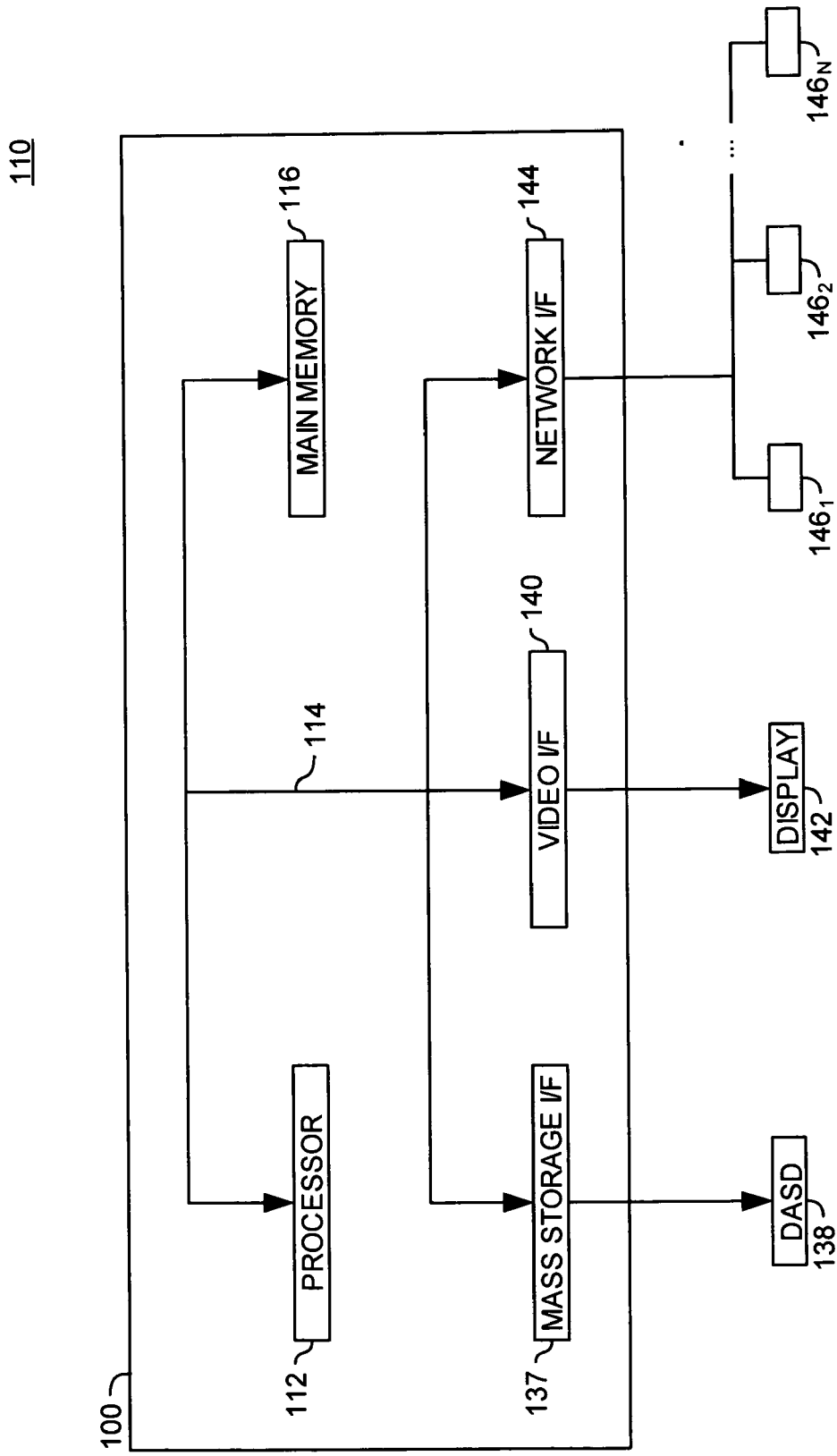
FIG. 1 is one embodiment of a computer system utilized in accordance with the invention.

The present invention is generally directed to a method, system and article of manufacture for managing access to data in databases and, more particularly, for managing access to consumable data in a database. In the context of the invention, consumable data is data in a database that is configured to be accessible for a predefined number of accesses. The predefined number of accesses can be defined by suitable metadata associated with the database. Each access to the consumable data can be tracked using a suitable tracking object associated with the consumable data.

In one embodiment, a requesting entity issues a query against an underlying database having consumable data. By way of example, the consumable data is data of a given field in the underlying database which is designated as consumable by suitable metadata associated with the database. The query is configured for retrieval of the consumable data from the underlying database. Accordingly, when the query is executed against the database, a query result is obtained that includes the consumable data. The obtained query result is returned to the requesting entity.

As the consumable data is configured to be accessible for only a predefined number of accesses, it is determined whether the predefined number of accesses is reached after execution of the query against the database. If the predefined number of accesses is reached, the consumable data is made inaccessible. By way of example, making the consumable data inaccessible can be performed by deleting the consumable data or by replacing the consumable data with replacement data. The replacement data may subsequently be replaced with other consumable data.

Preferred Embodiments

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

One embodiment of the invention is implemented as a program product for use with a computer system such as, for example, computer system 110 shown in FIG. 1 and described below. The program(s) of the program product defines functions of the embodiments (including the methods described herein) and can be contained on a variety of computer-readable media. Illustrative computer-readable media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information to/from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

An Exemplary Computing Environment

FIG. 1 shows a computer 100 (which is part of a computer system 110) that becomes a special-purpose computer according to an embodiment of the invention when configured with the features and functionality described herein. The computer 100 may represent any type of computer, computer system or other programmable electronic device, including a client computer, a server computer, a portable computer, a personal digital assistant (PDA), an embedded controller, a PC-based server, a minicomputer, a midrange computer, a mainframe computer, and other computers adapted to support the methods, apparatus, and article of manufacture of the invention. Illustratively, the computer 100 is part of a networked system 110. In this regard, the invention may be practiced in a distributed computing environment in which tasks are performed by remote processing devices that are linked through a communications network. In a distributed computing environment, program modules may be located in both local and remote memory storage devices. In another embodiment, the computer 100 is a standalone device. For purposes of construing the claims, the term "computer" shall mean any computerized device having at least one processor. The computer may be a standalone device or part of a network in which case the computer may be coupled by communication means (e.g., a local area network or a wide area network) to another device (i.e., another computer).

In any case, it is understood that FIG. 1 is merely one configuration for a computer system. Embodiments of the invention can apply to any comparable configuration, regardless of whether the computer 100 is a complicated multi-user apparatus, a single-user workstation, or a network appliance that does not have non-volatile storage of its own.

The computer 100 could include a number of operators and peripheral systems as shown, for example, by a mass storage interface 137 operably connected to a storage device 138, by a video interface 140 operably connected to a display 142, and by a network interface 144 operably connected to the plurality of networked devices 146 (which may be representative of the Internet) via a suitable network. Although storage 138 is shown as a single unit, it could be any combination of fixed and/or removable storage devices, such as fixed disc drives, floppy disc drives, tape drives, removable memory cards, or optical storage. The display 142 may be any video output device for outputting viewable information.

Computer 100 is shown comprising at least one processor 112, which obtains instructions and data via a bus 114 from a main memory 116. The processor 112 could be any processor adapted to support the methods of the invention. In particular, the computer processor 112 is selected to support the features of the present invention. Illustratively, the processor is a PowerPC® processor available from International Business Machines Corporation of Armonk, N.Y.

The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in the computer system 110, for example, any storage capacity used as virtual memory or stored on a mass storage device (e.g., direct access storage device 138) or on another computer coupled to the computer 100 via bus 114. Thus, main memory 116 and storage device 138 could be part of one virtual address space spanning multiple primary and secondary storage devices.

An Exemplary Database Access Management Environment

Figure 2:
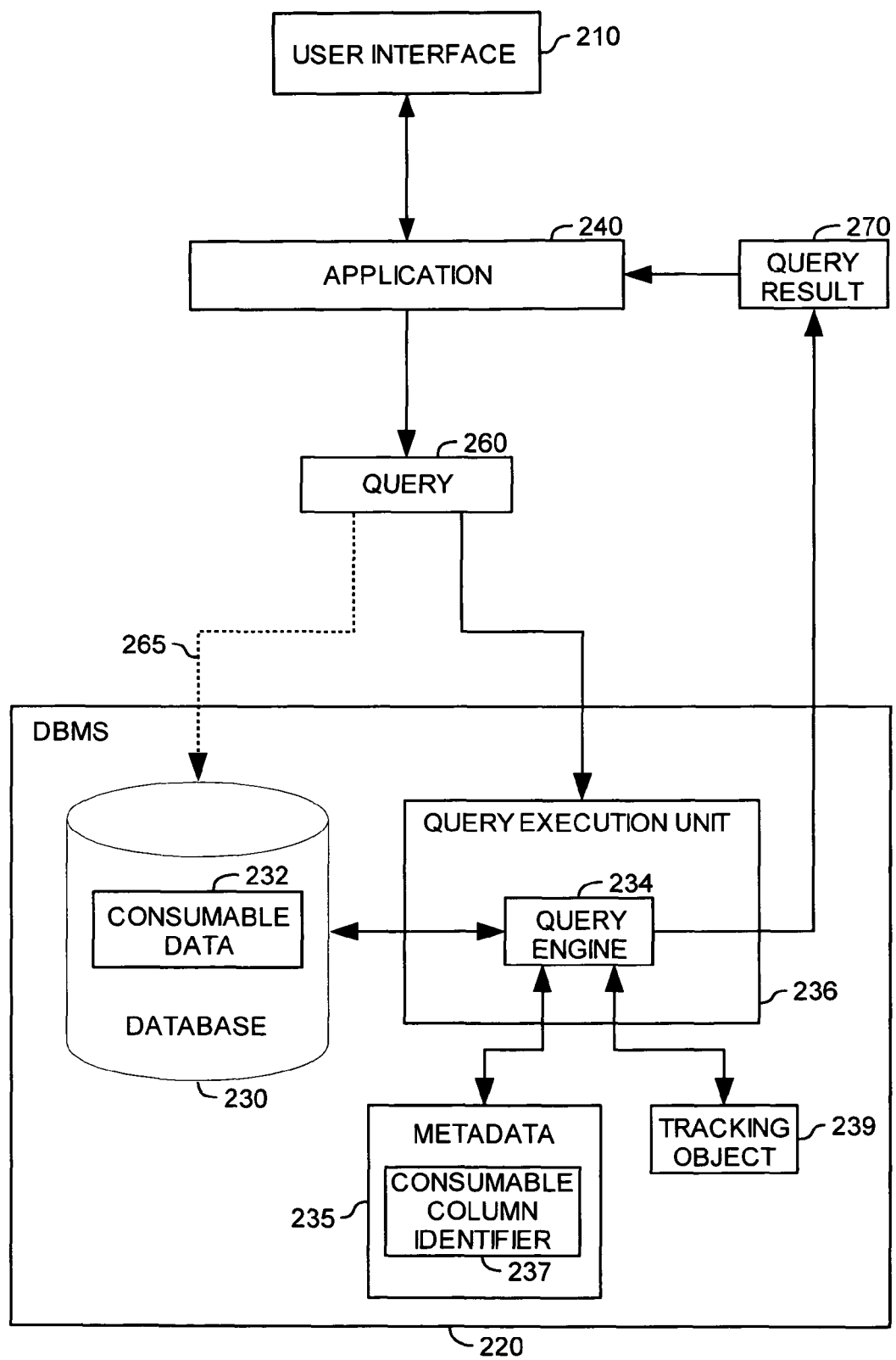
FIG. 2 is a relational view of software components of one embodiment of the invention.

Referring now to FIG. 2, a relational view of software components in one embodiment is illustrated. The software components illustratively include a user interface 210, a DBMS 220 and one or more applications 240 (only one application is illustrated for simplicity). The DBMS 220 illustratively includes a database 230 and a query execution unit 236 having a query engine 234.

The database 230 is shown as a single database, for simplicity. However, the database 230 can also be implemented by multiple databases which can be distributed relative to one another. Moreover, one or more databases can be distributed to one or more networked devices (e.g., networked devices 146 of FIG. 1).

The database 230 is representative of any collection of data regardless of the particular physical representation of the data. A physical representation of data defines an organizational schema of the data. By way of illustration, the database 230 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of the data included with the database 230.

Illustratively, the database 230 includes consumable data 232. In one embodiment, the consumable data 232 is data of one or more fields which are designated as consumable by suitable metadata 235 which is associated with the database 230. In other words, the data 232 is only consumable as the one or more fields which include the data are designated as consumable. However, it should be noted that any implementation that allows identifying the data 232 as consumable data is broadly contemplated. For instance, assume that the database 230 is organized according to a relational schema having one or more database tables, each including at least one column. In this case, the metadata 235 may include a consumable column identifier 237 which designates one or more columns of one or more of the at least one of the database tables as consumable.

In one embodiment, the consumable data 232 is used to define a limited number of secure keys that can be retrieved and used when required, whereby each key is made inaccessible after use thereof. Accordingly, a secure key generator can be implemented using the consumable data 232, whereby a key is made available in the consumable column only for a limited number of accesses (i.e., corresponding to users or individual uses of the key by the same user). After the predefined limited number of accesses to the key in the consumable column, the key is made inaccessible. Another example for use of the consumable data 232 is queuing of workflow tasks. More specifically, as a workflow task is queued, a corresponding function call can be added to a consumable column in an underlying database. When a given workflow task should be executed, its corresponding function call can be retrieved from the consumable column using a suitable query. The retrieved function call can automatically be deleted when the underlying workflow task is launched independent of an execution status of the underlying workflow task. Furthermore, a consumable column can be used to store objects in a semi-persistent manner. In other words, when a given object is needed, it can be queried, retrieved from the column in response to the query and then automatically removed from the consumable column. However, it should be noted that the above examples for use of the consumable data 232 are not intended to define an exhaustive list. Instead, these examples are merely described by way of example and any possible use of consumable columns in database tables is broadly contemplated.

According to one aspect, the application(s) 240 (and more generally, any requesting entity including, at the highest level, users) issues queries such as query 260 against the database 230, as indicated by a dashed arrow 265. In general, the queries issued by the application 240 can be predefined (i.e., hard coded as part of the application(s) 240) or generated in response to input (e.g., user input). Illustratively, the queries issued by the application(s) 240 are created by users using the user interface 210, which can be any suitable user interface configured to create/submit queries. According to one aspect, the user interface 210 is a graphical user interface. However, it should be noted that the user interface 210 is only shown by way of example; any suitable requesting entity may create and submit queries against the database 230 (e.g., the application(s) 240, an operating system or an end user). Accordingly, all such implementations are broadly contemplated.

In one embodiment, the requesting entity accesses a suitable database connectivity tool such as a Web application, an Open DataBase Connectivity (ODBC) driver, a Java DataBase Connectivity (JDBC) driver or a Java Application Programming Interface (Java API) for creation of a query. A Web application is an application that is accessible by a Web browser and that provides some function beyond static display of information, for instance by allowing the requesting entity to query the database 230. An ODBC driver is a driver that provides a set of standard application programming interfaces to perform database functions such as connecting to the database 230, performing dynamic SQL functions, and committing or rolling back database transactions. A JDBC driver is a program included with a database management system (e.g., DBMS 220) to support JDBC standard access between the database 230 and Java applications. A Java API is a Java-based interface that allows an application program (e.g., the requesting entity, the ODBC or the JDBC) that is written in a high-level language to use specific data or functions of an operating system or another program (e.g., the application(s) 240).

In one embodiment, in order to simplify query creation, the query 260 is created using an abstraction model that hides some of the complexities of the physical layout of the database 230 from the user. The abstraction model may include logical fields with recognizable names that map to corresponding physical fields of the underlying database 230. Thus, "abstract" queries may be generated containing conditions based on the logical fields. Upon issuance, the logical fields of an abstract query may be mapped to corresponding physical fields to create a physical or "concrete" query (e.g., query 260). For some applications, abstract queries may be saved, allowing subsequent users to reuse the saved abstract queries without having to generate their own. The concepts of data abstraction and abstract queries are described in detail in the commonly owned, co-pending application Ser. No. 10/083,075, entitled "APPLICATION PORTABILITY AND EXTENSIBILITY THROUGH DATABASE SCHEMA AND QUERY ABSTRACTION", filed Feb. 26, 2002, which is incorporated herein by reference in its entirety.

Illustratively, the query 260 is issued from the application(s) 240 to the query execution unit 236 which processes the query 260. It should be noted that the query execution unit 236 illustratively only includes the query engine 234, for simplicity. However, the query execution unit 236 may include other components, such as a query parser and a query optimizer. A query parser is generally configured to accept a received query input from a requesting entity, such as the application(s) 240, and then parse the received query. The query parser may then forward the parsed query to the query optimizer for optimization. A query optimizer is an application program which is configured to construct a near optimal search strategy (known as an "access plan") for a given set of search parameters, according to known characteristics of an underlying database (e.g., the database 230), an underlying system on which the search strategy will be executed (e.g., computer system 110 of FIG. 1), and/or optional user specified optimization goals. But not all strategies are equal and various factors may affect the choice of an optimum search strategy. However, in general such search strategies merely determine an optimized use of available hardware/software components to execute respective queries. The query optimizer may then forward the optimized query to the query engine 234 for execution.

The query engine 234 executes the query 260 against the database 230 to determine a query result 270 for the query 260. The query result 270 is returned to the application(s) 240.

In one embodiment, the query 260 is configured to access the consumable data 232. Accordingly, at least a portion of the consumable data 232 is included with the query result 270. If after execution of the query 260 against the database 230 the at least one portion of the consumable data 232 was accessed a predefined number of accesses, the at least one portion of the consumable data 232 is made inaccessible. To this end, a suitable tracking object 239 (e.g., a counter) is configured to track the number of accesses to the at least one portion of the consumable data 232. Each new access to the at least one portion of the consumable data 232 causes the query engine 234 to increment a count value maintained by the tracking object 239. Then, in one embodiment, the updated actual number of accesses is compared with the predefined number of accesses defined by the metadata 235. If the updated actual number of accesses equals the predefined number of accesses, the at least one portion of the consumable data 232 is made inaccessible, as described in more detail below with reference to FIG. 3.

An exemplary method of managing access to consumable data in an underlying database is described below with reference to FIG. 3. An exemplary method for determining whether a predefined number of accesses to consumable data in an underlying database is reached is described below with reference to FIG. 4.

Accessing Consumable Data in a Database

Figure 3:
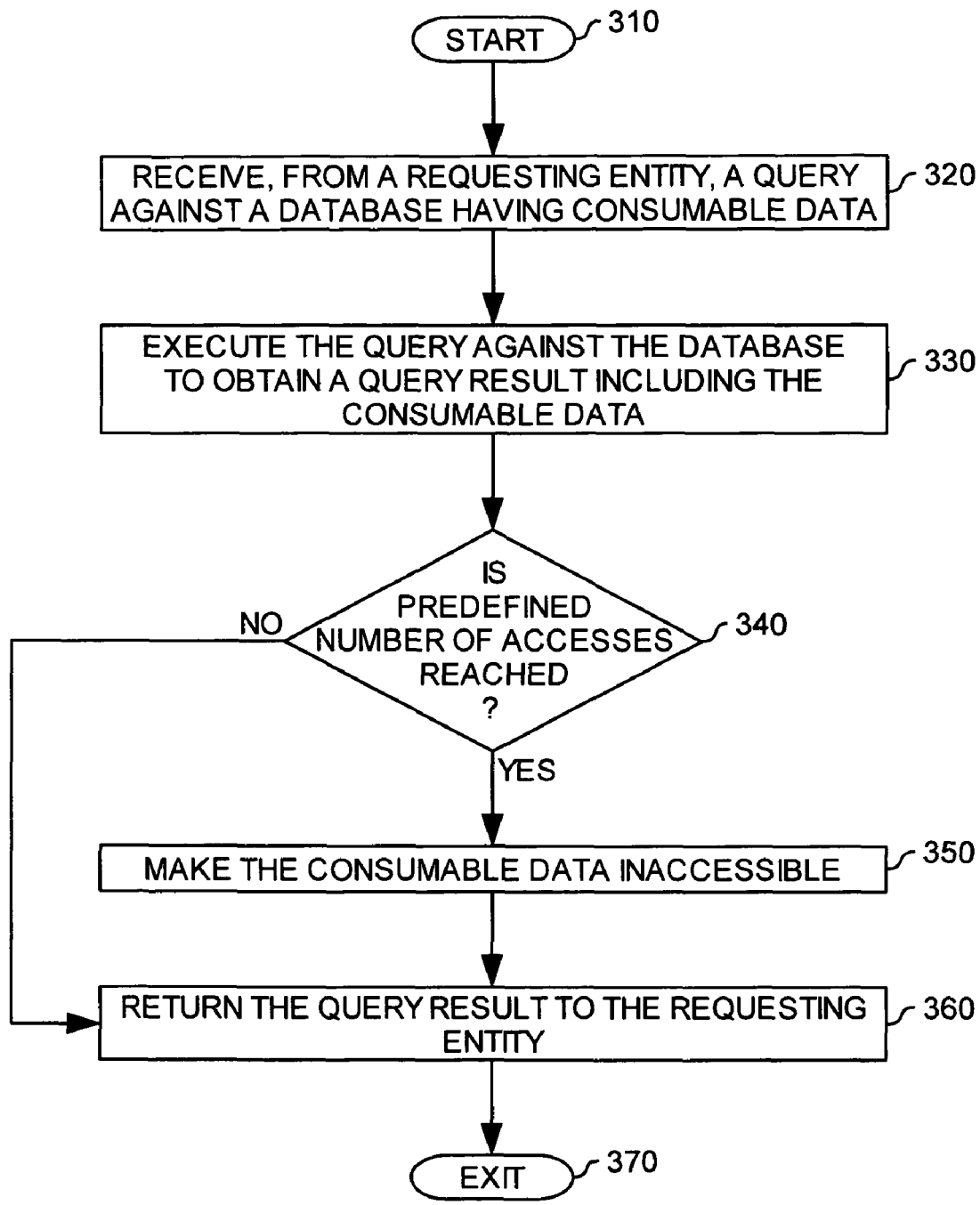
FIG. 3 is a flow chart illustrating a method of managing access to data in a database in one embodiment.

Referring now to FIG. 3, one embodiment of a method 300 for managing access to consumable data (e.g., consumable data 232 of FIG. 2) in an underlying database (e.g., database 230 of FIG. 2) is illustrated. The consumable data is configured to be accessible only for a predefined number of accesses. In one embodiment, at least part of the steps of the method 300 is performed by the query engine 234 of FIG. 2. Furthermore, at least several steps of the method 300 can be performed on the basis of user input received via the user interface 210 of FIG. 2. Method 300 starts at step 310.

At step 320, a query (e.g., query 260 of FIG. 2) against the underlying database is received from a requesting entity (e.g., application(s) 240 of FIG. 2 or a user). In one embodiment, the received query is configured to access at least a portion of the consumable data in the database 230. In one embodiment, the query is issued by the application(s) 240 after being composed by a user using the user interface 210 of FIG. 2.

At step 330, the received query is executed against the underlying database, whereby a corresponding query result (e.g., query result 270 of FIG. 2) is generated. The query result includes the at least one portion of the consumable data. By way of example, assume now that the application(s) 240 of FIG. 2 issues the query against a database having a table "Task Table" including a column having task information which is designated as consumable. Accordingly, the "Task" column illustratively defines the consumable data 232 of FIG. 2. An exemplary "Task Table" is shown in Table I below.

TABLE I

| EXEMPLARY DATABASE TABLE "TASK TABLE" | | | |
|---|---|---|---|
| 001 | PROCESSOR | SLOT# | TASK |
| 002 | 10001 | 1 | Query 1 |
| 003 | 10001 | 2 | Query 2 |
| 004 | 10002 | 1 | Query 3 |
| 005 | 10002 | 2 | Query 4 |

As can be seen from Table I, the "Task Table" illustratively contains a PROCESSOR, a SLOT# and a TASK column including corresponding processor, slot number and task information. For instance, according to line 002, a task "Query 1" can be retrieved for execution by a slot number "1" of a processor "10001". In the context of the invention, a slot is a unit of work that is associated with a given processor. Furthermore, as was noted above, only the TASK column is designated as consumable. However, it should be noted that any given number of columns in the exemplary "Task Table" can be designated as consumable. In one embodiment, the TASK column is designated as consumable by a developer or administrator who creates the column and/or the "Task Table" and corresponding metadata (e.g., metadata 235 of FIG. 2).

Assume now that the exemplary query illustrated in Table II below is issued by the application(s) 240 of FIG. 2 against the exemplary "Task Table" of Table I and received at step 320. Assume further that the exemplary query of Table II below is issued to identify a task from the "Task Table" which is to be performed next by a corresponding processor, e.g., in the context of an executing workflow. By way of example, the exemplary query of Table II is illustrated in SQL and it is assumed that the exemplary "Task Table" of Table I is included with a relational database. However, persons skilled in the art will readily recognize other possible implementations, such as corresponding XML queries and databases that are arranged according to XML schemas. Accordingly, it should be noted that implementation of the exemplary query is not limited to a particular machine-readable language and that an implementation in any machine-readable language, known or unknown, is broadly contemplated.

TABLE II

QUERY EXAMPLE

| | |
|---|---|
| 001 | SELECT * |
| 002 | FROM TaskTable |
| 003 | WHERE PROCESSOR = 10001 AND SLOT# = 2 |

It should be noted that the exemplary query of Table II is configured to access the data record in line 003 of the "Task-Table" of Table I (according to line 002 of Table II). More specifically, the exemplary query of Table II is configured to retrieve data for each column (according to line 001 of Table II) of a data record which refers to the processor 10001 with the slot number 2 (according to line 003 of Table II). Accordingly, the query result illustrated in Table III below is obtained.

TABLE III

EXEMPLARY QUERY RESULT

| | PROCESSOR | SLOT# | TASK |
|---|---|---|---|
| 001 | | | |
| 002 | 10001 | 2 | Query 2 |

As can be seen from line 002 of Table III, the exemplary query result includes line 003 of Table I, as was noted above. Furthermore, it should be noted that only the task "Query 2" (line 002) of the consumable TASK column of the exemplary "Task Table" of Table I above was retrieved. In other words, only a portion of the consumable data in the TASK column of Table I, i.e., the consumable TASK column, was accessed.

Then, at step 340 it is determined whether a predefined number of accesses to the at least one portion of the consumable data is reached. An exemplary method for determining whether the predefined number of accesses is reached is described below with reference to FIG. 4.

In one embodiment, the predefined number of accesses is reached if the at least one portion of the consumable data was accessed a given number of times. In another embodiment, the predefined number of accesses is reached if a predefined number of users have accessed the at least one portion of the consumable data. For instance, the corresponding metadata may define that four different users should be allowed to access the at least one portion of the consumable data. In other words, the at least one portion of the consumable data is only made inaccessible once each of the four different users has accessed the at least one portion of the consumable data at least once. Accordingly, a given one of the four users may access the at least one portion of the consumable data multiple times without affecting availability of the data tp the other users. In still another embodiment, the corresponding metadata may specify that the predefined number of accesses is reached when four specific users (e.g., Larry, Joe, Bob and John) have accessed the at least one portion of the consumable data. In this case, one of the four users or a fifth user (e.g., Richard) may also access the at least one portion of the consumable data multiple times. According to one aspect, this may not affect availability of the data to other users, as long as the four specific users have not accessed the at least one portion of the consumable data at least once. However, in this case security restrictions can be placed on the at least one portion of the consumable data so that only the four specific users are authorized to access the at least one portion of the consumable data. All such different implementations are broadly contemplated.

If it is determined at step 340 that the predefined number of accesses is reached, the method 300 proceeds with step 350. Otherwise, the method 300 proceeds with step 360.

At step 350, the at least one portion of the consumable data is made inaccessible. In one embodiment, making the at least one portion of the consumable data inaccessible includes replacing the at least one portion of the consumable data with replacement data. The replacement data may subsequently be replaced with other consumable data. By way of example, assume that the task "Query 2" in the consumable TASK column of Table I is replaced with a null value. Accordingly, the exemplary modified "Task Table" shown in Table IV below is obtained.

TABLE IV

EXEMPLARY MODIFIED DATABASE TABLE "TASK TABLE"

| 001 | PROCESSOR | SLOT# | TASK |
|---|---|---|---|
| 002 | 10001 | 1 | Query 1 |
| 003 | 10001 | 2 | NULL |
| 004 | 10002 | 1 | Query 3 |
| 005 | 10002 | 2 | Query 4 |

As can be seen from Table IV, the task "Query 2" in line 003 of Table I was replaced with a null value "NULL" (line 003). As was noted above, the null value may subsequently be replaced with other consumable data, such as "Query N", which may also be accessible only for a given number of accesses.

At step 360 the obtained query result is returned to the application(s) 240 of FIG. 2. Method 300 then exits at step 370.

It should be noted, that the method 300 of FIG. 3 is merely described to exemplify one embodiment of managing access to the consumable data in the underlying database. However, the invention is not limited to the described embodiment and various modifications are conceivable. Accordingly, in different embodiments the execution sequence of the steps of the exemplary method 300 may vary. For instance, returning the query result according to step 360 can be performed before determining (according to step 340) whether the predefined number of accesses is reached. Or, prior to executing the query according to step 330 it can be determined (according to step 340) whether the predefined number of accesses is reached. In this case, execution of the query can be prevented when the predefined number is already reached before execution. Furthermore, any possible implementation of particular method steps is also broadly contemplated. For instance, instead of replacing the consumable data with a replacement value, the consumable data can be deleted. By way of example, assume an underlying database having a table "Key Table" including a single KEY column which is designated as consumable. An exemplary "Key Table" is shown in Table V below.

TABLE V

EXEMPLARY DATABASE TABLE "KEY TABLE"

| 001 | KEY |
|---|---|
| 002 | 123432432 |
| 003 | 234125433 |
| 004 | 435646455 |
| 005 | 876785645 |
| 006 | 356465434 |

As can be seen from Table V, the KEY column includes five exemplary secure keys (lines 002-006). Assume now that the "Key Table" of Table V is configured to implement a secure key generator where each key is deleted from the KEY column when it has been retrieved by a given requesting entity. Assume further that the secure key in line 002 of Table V is retrieved by the application(s) 240 of FIG. 2 using the exemplary query illustrated in Table VI below. By way of example, the exemplary query of Table VI is illustrated in SQL. However, it should be noted that implementation of the exemplary query is not limited to a particular machine-readable language and that an implementation in any machine-readable language, known or unknown, is broadly contemplated.

TABLE VI

QUERY EXAMPLE

| 001 | SELECT KEY |
|---|---|
| 002 | FROM KeyTable |
| 003 | FETCH first 1 rows only |

As can be seen from line 003, the exemplary query of Table VI requests for the secure key which is contained in the first row of the KEY column in the exemplary "Key Table" of Table V. As was noted above, when this key is returned to the application(s) 240 of FIG. 2, it is deleted from the KEY column such that the exemplary table of Table V subsequently reads as shown in Table VII below.

TABLE VII

EXEMPLARY MODIFIED DATABASE TABLE "KEY TABLE"

| 001 | KEY |
|---|---|
| 002 | 234125433 |
| 003 | 435646455 |
| 004 | 876785645 |
| 005 | 356465434 |

As can be seen from the modified "Key Table" of Table VII, the first row (line 002) of the exemplary "Key Table" of Table V having the key "123432432" has been deleted and all remaining rows (lines 003-006) are respectively shifted up one row. However, instead of shifting the remaining rows up, the retrieved key "123432432" (line 001 of Table V) may simply be replaced with a null value, as illustrated in the example described above with reference to Tables I-IV. Thus, the null value may subsequently be replaced with a new key. To this end, in one embodiment an update trigger can be configured to monitor the available number of keys in the KEY column of Tables V and VII to determine when the available number reaches a predetermined lower threshold, e.g., "0". The update trigger can further be configured to generate new secure keys when the monitoring indicates that the predetermined lower threshold is reached. Accordingly, an efficient key generator which is configured for dynamically generating secure keys can be implemented.

Figure 4:
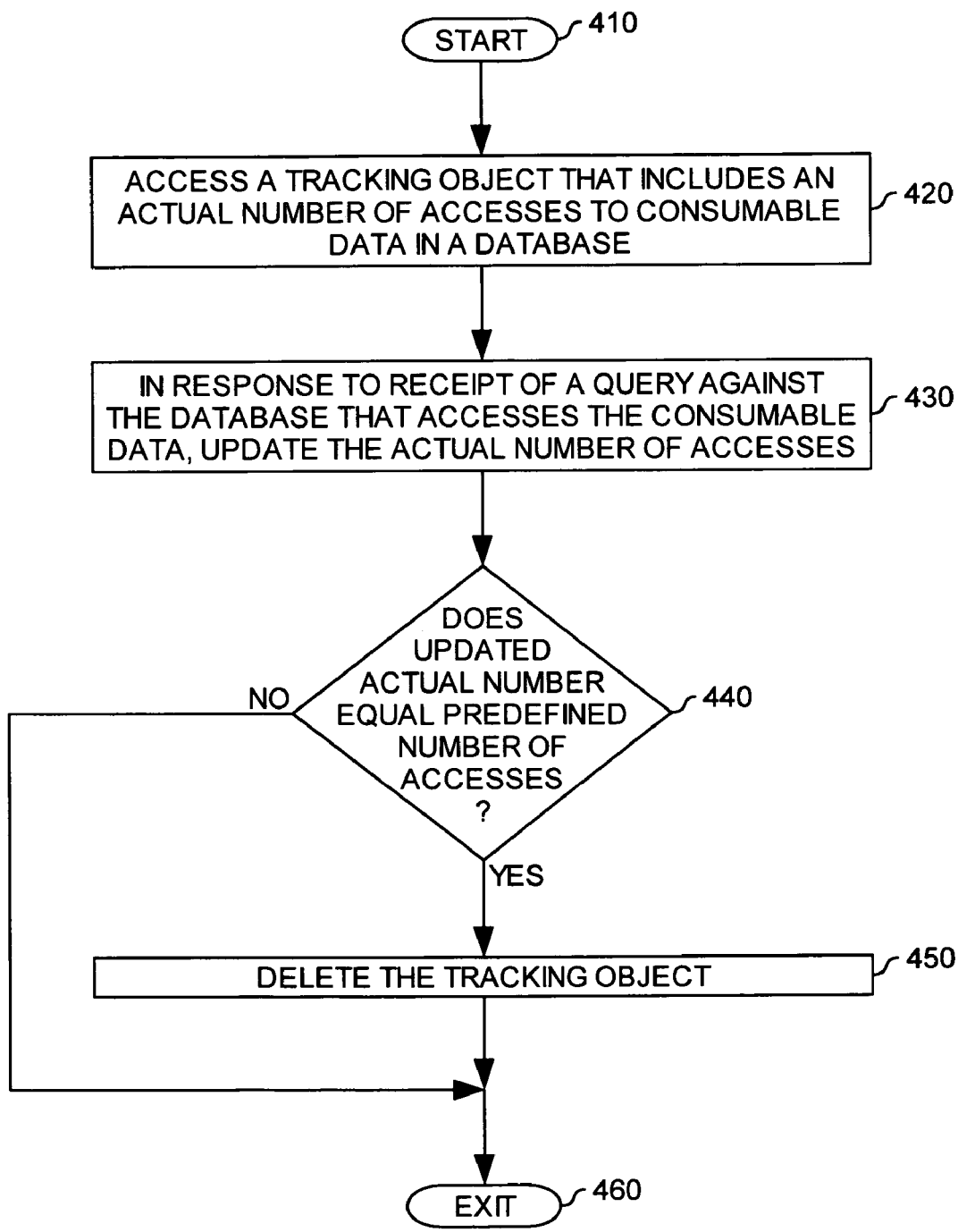
FIG. 4 is a flow chart illustrating a method of determining when a predefined number of accesses of consumable data in a database is reached in one embodiment.

Referring now to FIG. 4, an exemplary method 400 for determining whether a predefined number of accesses to consumable data (e.g., consumable data 232 of FIG. 2) in an underlying database (e.g., database 230 of FIG. 2) is reached is illustrated. According to one aspect, method 400 is entered from step 330 of FIG. 3. In one embodiment, at least part of the steps of the method 400 is performed by the query engine 234 of FIG. 2. Method 400 starts at step 410.

At step 420, a tracking object (e.g., tracking object 239 of FIG. 2) that includes an actual number of accesses to the consumable data is accessed. Thus, the actual number of accesses to the consumable data can be determined. In one embodiment, the actual number of accesses indicates a number of accesses to a table column in the underlying database which is designated as consumable.

At step 430, the actual number of accesses is updated. In the given example, the actual number of accesses is updated in response to receipt of a query (e.g., query 260 of FIG. 2) configured to access the consumable column. In one embodiment, the actual number of accesses is incremented by one each time the consumable column is accessed.

At step 440, it is determined whether the updated actual number of accesses equals a predefined number of accesses, i.e., whether the predefined number of accesses is reached. If the predefined number of accesses is not reached, the method 400 exits at step 460. Otherwise, the method 400 proceeds with step 450.

At step 450, the tracking object is deleted. The method 400 then exits at step 460.

However, it should be noted that deleting the tracking object is merely one possible implementation and that other implementations are conceivable. More specifically, if the consumable data is made inaccessible by deletion of the consumable data, it can be assumed that the tracking object is no longer required and can, therefore, also be deleted. If, however, the consumable data is only replaced with suitable replacement data which is replaceable with other consumable data, the tracking object can still be useful. In this case, instead of deleting the tracking object, the actual number of accesses in the tracking object can simply be reset to "0" for subsequent use thereof. All such implementations are broadly contemplated.

While the foregoing is directed to embodiments of the present invention, other and further embodiments of the invention may be devised without departing from the basic scope thereof, and the scope thereof is determined by the claims that follow.

What is claimed is:

1. A computer-implemented method of managing access to data in a database, comprising:
   receiving, from a requesting entity, a query against a database having consumable data that is configured to be accessible for only a predefined number of accesses, the query being configured to access the consumable data;
   executing the query against the database to obtain a query result that includes the consumable data;
   determining whether the predefined number of accesses is reached as a result of the execution of the query against the database; and
   if so:
      making the consumable data inaccessible; and
      returning the obtained query result to the requesting entity,
   wherein: making the consumable data inaccessible comprises at least replacing the consumable data with replacement data that includes one or more null values, and the method further comprises subsequently replacing the replacement data with suitable consumable data, and the consumable data is stored in a column of a database table, the column being defined as a consumable column according to metadata including the predefined number of accesses.

2. The method of claim 1, wherein making the consumable data inaccessible further comprises deleting the consumable data.

3. The method of claim 1, wherein the predefined number of accesses is one, whereby only a single access to the consumable data is allowed.

4. The method of claim 1, wherein the predefined number of accesses is defined by a number of authorized users, each being allowed to access the consumable data a specified number of times.

5. The method of claim 1, wherein the predefined number of accesses is defined by metadata associated with the consumable data.

6. The method of claim 1, wherein determining whether the predefined number of accesses is reached comprises:
- accessing a tracking object including an actual number of accesses of the consumable data;
- updating the actual number of accesses in the tracking object to reflect access to the consumable data by the executed query; and
- comparing the updated actual number of accesses in the tracking object to the predefined number of accesses, wherein the predefined number of accesses is reached when the updated actual number of accesses equals the predefined number of accesses.

7. The method of claim 6, further comprising:
- if the updated actual number of accesses equals the predefined number of accesses, deleting the tracking object.

8. The method of claim 1, wherein the consumable data becomes inaccessible after the predefined number of accesses as a result of being stored in a database table column that is defined as a consumable column according to metadata including the predefined number of accesses.

9. The method of claim 1, wherein the consumable data comprises a first secure key and the suitable consumable data comprises a second secure key.

10. The method of claim 9, further comprising:
- monitoring whether the predefined number of accesses to the first secure key is reached, and
- generating the second secure key when the monitoring indicates that the predefined number of accesses to the first secure key is reached.

* * * * *